US006176012B1

(12) United States Patent
Ishimatsu

(10) Patent No.: US 6,176,012 B1
(45) Date of Patent: Jan. 23, 2001

(54) METHOD FOR MANUFACTURING AN INK JET RECORDING HEAD AND AN INK JET RECORDING HEAD

(75) Inventor: Shin Ishimatsu, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/989,183

(22) Filed: Dec. 11, 1997

(30) Foreign Application Priority Data

Dec. 13, 1996 (JP) .................................................. 8-333709

(51) Int. Cl.[7] ............................ B21D 53/76; B23P 17/00
(52) U.S. Cl. ............................................ 29/890.1; 347/65
(58) Field of Search .................................. 29/25.35, 611, 29/890.1; 347/63, 65

(56) References Cited

U.S. PATENT DOCUMENTS

| | | | | |
|---|---|---|---|---|
| 5,208,604 | * | 5/1993 | Watanabe et al. | 346/1.1 |
| 5,389,954 | * | 2/1995 | Inaba et al. | 346/1.1 |
| 5,548,894 | | 8/1996 | Muto | 29/890.1 |
| 5,694,684 | * | 12/1997 | Yamamoto | 29/890.1 |
| 5,697,144 | * | 12/1997 | Mitani et al. | 347/65 |
| 5,748,213 | | 5/1998 | Karita et al. | 347/63 |
| 5,808,641 | * | 9/1998 | Miyagawa et al. | 347/65 |
| 5,811,019 | * | 9/1998 | Nakayama et al. | 29/890.1 |

FOREIGN PATENT DOCUMENTS

| | | |
|---|---|---|
| 0 609 012 | 8/1994 | (EP) . |
| 0 695 642 | 2/1996 | (EP) . |
| 55-132253 | 10/1980 | (JP) . |
| 2-121845 | 5/1990 | (JP) . |
| 49131244 | 5/1992 | (JP) . |
| 8-238777 | 9/1996 | (JP) . |

* cited by examiner

*Primary Examiner*—David P. Bryant
*Assistant Examiner*—Jermie E. Cozart
(74) *Attorney, Agent, or Firm*—Fitzpatrick, Cella, Harper & Scinto

(57) ABSTRACT

A method for manufacturing an ink jet recording head, which is provided with a plurality of ink paths structured by bonding a second substrate having a plurality of grooves arranged thereon to form ink paths corresponding to a plurality of discharge openings, together with a first substrate having discharge energy generating devices arranged in the ink paths, respectively, comprises the step of processing the grooves constituting the ink paths on the second substrate by means of formation processing, and laser processing, divisionally. This method makes it possible to process ink flow paths with ease and good production yield even when the ink flow paths are arranged in such a high density that its formation becomes difficult by the application of formation processing, and also, to reduce the total energy of laser when ink flow paths are processed as compared with the method adopted conventionally. The required load given to the optical system of a laser processor is made smaller accordingly.

8 Claims, 7 Drawing Sheets

METHOD FOR MANUFACTURING AN INK JET RECORDING HEAD AND AN INK JET RECORDING HEAD

BACKGROUND OF THE INVENTION

1. Field of the Invention

The present invention relates to a method for manufacturing an ink jet recording head, and an ink jet recording head manufactured using such method of manufacture.

2. Related Background Art

Conventionally, as disclosed in the specification of Japanese Patent Laid-Open Application No. 55-132253, for example, an ink jet recording head is structured by bonding a first substrate, which is provided with discharge energy generating devices arranged on a silicon substrate, together with a second substrate, which is provided with the recessed portion that forms ink flow paths when bonded to the first substrate; an orifice plate conductively connected with the ink flow paths to form discharge openings for discharging ink; and the recessed portion that constitutes a common liquid chamber that provisionally retains ink to be supplied to each of the discharge openings.

Also, in the specification of Japanese Patent Laid-Open Application No. 2-121845, a method for processing the grooves that constitute ink paths is introduced for an ink jet recording head structured by bonding a ceiling plate, which is provided with the recessed portions to form ink paths arranged corresponding to each of a plurality of discharge openings, as well as a common liquid chamber that retains ink to be supplied to the ink paths, together with a substrate having discharge energy generating devices arrange on a part of each of the ink paths. In this method, the ceiling plate having the grooves to form the common liquid chamber is produced by means of an injection molding, and then, the ink paths are formed by the irradiation of excimer laser on the ceiling plate thus produced.

However, in recent years, there have been more demands on higher precision as image quality along with the wider use of digital cameras or the like. In order to meet such demand on the image quality that requires higher precision, the density of ink flow paths should be arranged to be as high as 600 DPI (the pitches of ink flow paths being 42.375 $\mu$m) or more. However, in accordance with the method for forming the ink flow paths by means of injection molding, which is disclosed in the Japanese Patent Laid-Open Application No. 55-132253, the production yield should be extremely lowered if this method is adopted for manufacturing heads having such higher density of flow paths as compared with the heads conventionally in use. Here, the problems are encountered, such as defective flow-in of resin into the metallic mold, and the chips that may be present at the time of mold releasing to make the product defective. Also, regarding the method for forming ink flow paths by the irradiation of excimer laser, which is disclosed in the Japanese Patent Laid-Open Application No. 2-121845, the region of laser irradiation should be increased in order to meet the demand on the higher density of ink flow path arrangement. This requirement results in the heat accumulation on the ceiling plate more than conventionally accumulated on it, which inevitably leads to the expansion of the work. At the same time, with the higher arrangement of ink flow paths thus required, allowable errors become smaller so that it is made difficult to stabilize the formation of ink flow paths in a desired precision.

As described above, therefore, there is a need for the provision of a method for manufacturing ink jet recording head, which is capable of forming the ink flow paths in a desired precision stably when the ink flow paths should be arranged in a density of as high as 600 DPI or more, for example.

SUMMARY OF THE INVENTION

The present invention is designed in consideration of the problems described above. It is an object of the invention to provide a method for manufacturing an ink jet recording head, which is capable of attaining the provision of higher precision for image quality with ease at lower costs. It is still another object of the invention to provide an ink jet recording head manufactured by use of such method of manufacture.

In order to achieve such objectives, the method of manufacture of the present invention for an ink jet recording head, which is provided with a plurality of ink paths structured by bonding a second substrate having a plurality of grooves arranged thereon to form ink paths corresponding to a plurality of discharge openings, together with a first substrate having discharge energy generating devices arranged in the ink paths, respectively, comprises the step of processing the grooves constituting the ink paths on the second substrate by means of formation processing, and laser processing, divisionally (separately).

In accordance with the method of manufacture of the present invention described above, it becomes possible to reduce the opportunities that the optical system of laser processor is damaged even when it is difficult for the conventional method to process ink flow paths arranged in such a high density that the mold release cannot be made easily at the time of formation processing or no laser processing is possible due to its thermal influences. Furthermore, it is made possible to provide a second substrate having a lesser amount of byproducts formed by laser abrasion, thus facilitating the manufacturing steps to follow, and also, providing an ink jet recording head capable of printing in higher precision with ease at lower costs.

Other objectives and advantages besides those discussed above will be apparent to those skilled in the art from the description of a preferred embodiment of the invention which follows. In the description, reference is made to accompanying drawings, which form a part hereof, and will illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Hereinafter, with reference to the accompanying drawings, the description will be made of the modes embodying the present invention in accordance with the plural embodiments given below.

(Embodiment 1)

Figure 1:
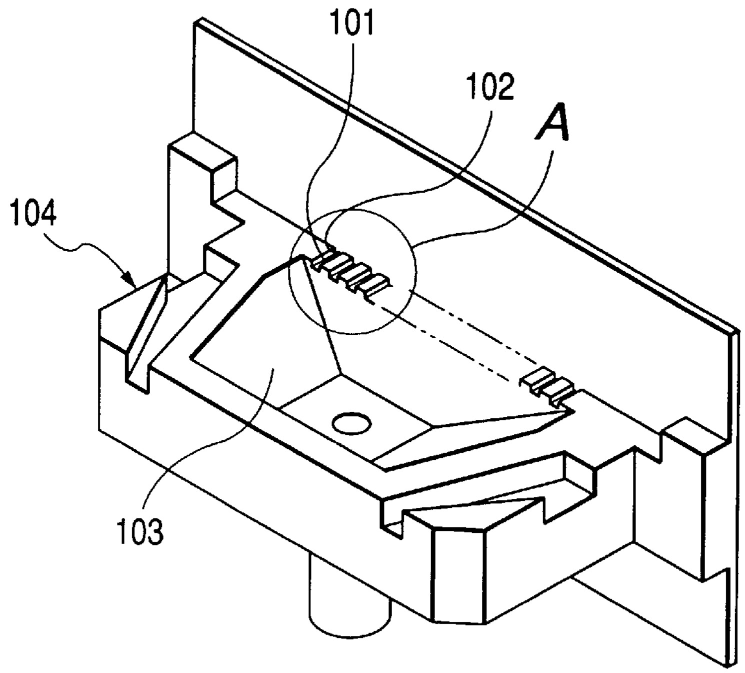
FIG. 1 is a perspective view which shows a second substrate (a ceiling plate) in accordance with a first embodiment in accordance with the present invention.
Figure 4:
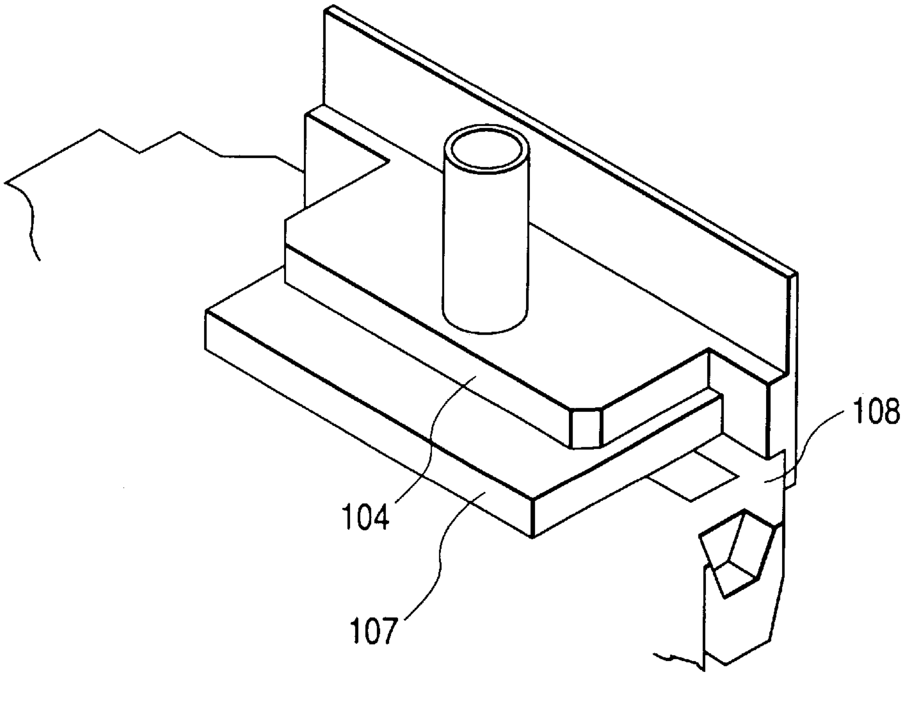
FIG. 4 is a perspective view which shows an ink jet recording head in accordance with the first embodiment of the present invention.
Figure 2A:
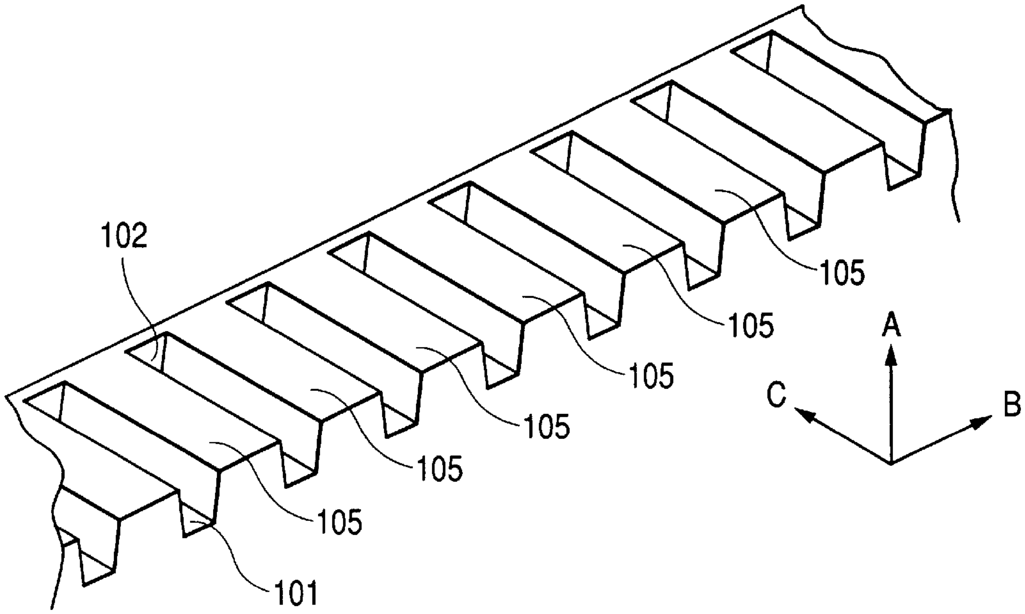
FIG. 2A is an enlarged view which shows the portion A of the second substrate represented in FIG. 1.
Figure 2B:
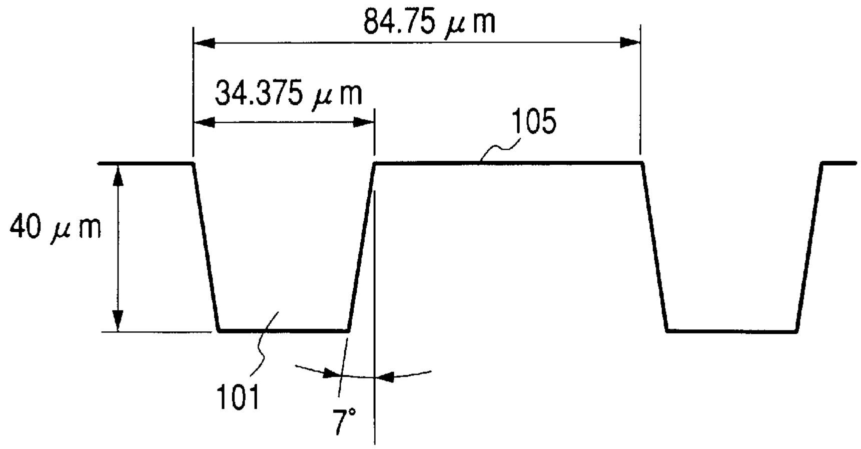
FIG. 2B is a cross-sectional view which shows the plane A and B of the portion represented in FIG. 2A.
Figure 3A:
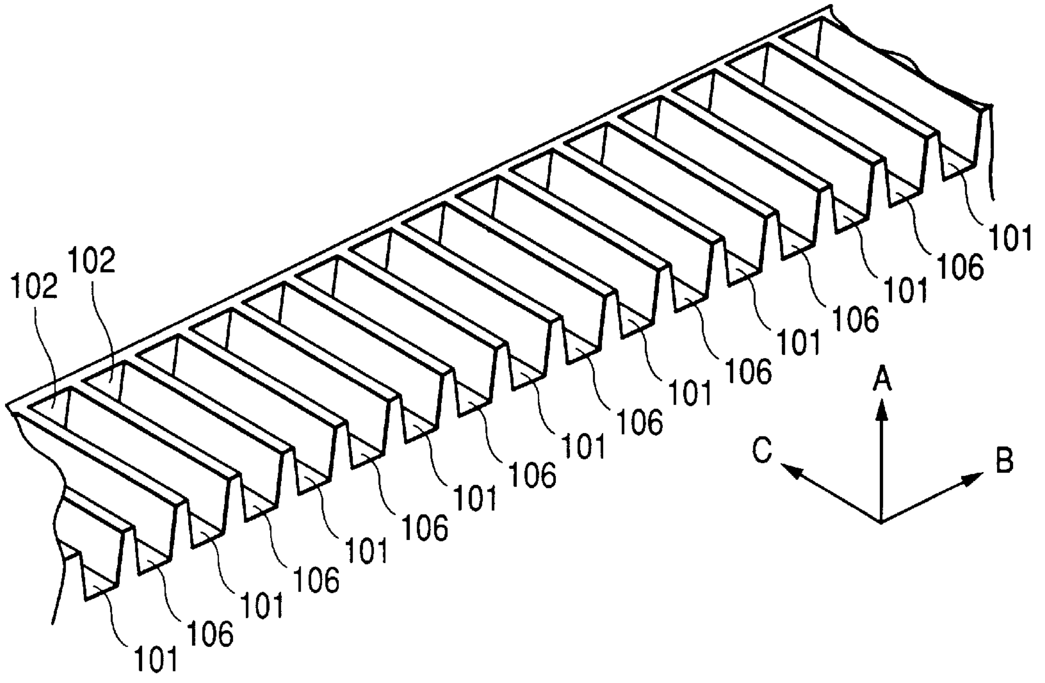
FIG. 3A is a perspective view which shows the second substrate after having processed the portion yet to be processed in FIGS. 2A and 2B.
Figure 3B:
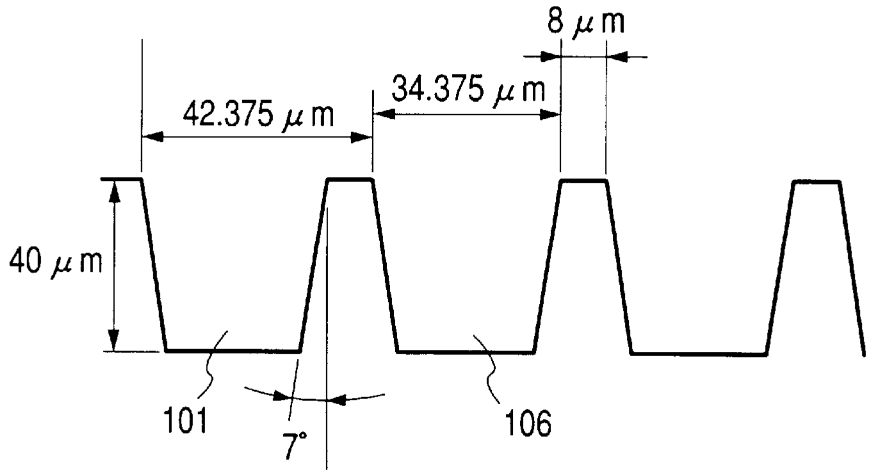
FIG. 3B is a cross-sectional view which shows the plane A and B of the portion represented in FIG. 3A.

In conjunction with FIGS. 1 to 4, the description will be made of a first embodiment in accordance with the present invention. FIG. 1 is a perspective view which shows a second substrate (a ceiling plate) in accordance with the first embodiment of the present invention. FIG. 2A is an enlarged view which shows the portion A of the second substrate represented in FIG. 1. FIG. 2B is a cross-sectional view which shows the plane A and B of the portion represented in FIG. 2A. FIG. 3A is a perspective view which shows the second substrate after having processed each portion yet to be processed in FIGS. 2A and 2B. FIG. 3B is a cross-sectional view which shows the plane A and B of the portion represented in FIG. 3A. FIG. 4 is a perspective view which shows an ink jet recording head assembled by bonding the first substrate together with the second substrate represented in FIGS. 3A and 3B.

In FIG. 1, a reference numeral 101 designates an ink flow path A produced in advance by means of formation molding; 102, the discharge opening portion where a discharge opening is processed to discharge ink, which is conductively connected with the ink flow path 101; 103, the common liquid chamber to provisionally retain ink; and 104, the second substrate having each of the ink flow paths 101, and discharge opening processing portions 102, as well as the common liquid chamber 103.

In FIGS. 2A and 2B, a reference numeral 105 designates the portions where ink flow paths are processed by the application of laser.

In FIGS. 3A and 3B, a reference numeral 106 designates the portions where ink flow paths B are processed by means of excimer laser.

Then, In FIG. 4, a reference numeral 107 designates the first substrate which is provided with discharge energy generating devices, and 108, the base plate which is used for fixing the first substrate.

For the present embodiment, a thin plate, which is cut off from a silicon wafer, is used for the first substrate 107. On the first substrate 107, a plurality of electrothermal transducing devices are formed as discharge energy generating devices by means of the thin film formation technologies and techniques. On the other hand, ink flow paths A101, and recessed portions are formed in advance on the second substrate 104 by means of injection molding or some other formation processing in order to produce the discharge opening plate 102 serving as the discharge opening processing portions, and also, to produce the common liquid chamber (see FIG. 1). It may be possible to use any material for the formation of the second substrate if only such material has good resistance to ink, while it can be processed easily by means of the injection molding and the laser processing. For the present embodiment, however, polysulfone is used. In FIG. 1. the size of each ink flow path A101 is made by the injection molding to be 40 μm×34.375 μm×400 μm (that is, (the dimension in the direction A)×(the dimension in the direction B)×(the dimension in the direction C) in FIG. 2A). 168 paths are arranged at pitches of 84.75 μm. Therefore, the width of each portion 105 yet to be processed, which remains between each of the ink flow paths A101, is 50 μm approximately, making it possible for the formation resin to be filled in the mold sufficiently for the formation processing. At the same time, the resin is given a sufficient strength when released from the mold. As a result, there is no fear that the portions yet to be processed may be damaged. Hence, the second substrate can be formed as shown in FIG. 1 with good production yield.

Then, on the ink flow path processing portions 105 of the second substrate 104, which is provided with each of the ink flow paths A101 thus formed by means of such formation processing, excimer laser is irradiated at 200 pulses with the laser energy concentration of 1 $J/cm^2$·puls on the surface of the processing portions. Thus, 168 ink flow paths B106 are formed each in size of 40 μm×34.375 μm×400 μm (that is, (the dimension in the direction A)×(the dimension in the direction B)×(the dimension in the direction C) in FIG. 3A). Each of the rectangular grooves, which is dimensioned as described above, is actually provided with the releasing taper of 7° (degree) at the time of injection molding, as well as the processing taper 7° (degree) at the time of laser processing, respectively. Therefore, each of the grooves is configured as shown in the section A and B in FIGS. 2A and 2B, and in FIGS. 3A and 3B.

For the laser processing of the present embodiment, the amount of the laser irradiation is just approximately a half the actual amount needed for forming the 336 ink paths in the arrangement density of 600 DPI, hence making it possible to significantly reduce the influence of the thermal expansion to be exerted on the work, that is, a second substrate. At the same time, it becomes possible to reduce the opportunities that may cause the laser processor to be damaged.

As described above, after the formation of the second substrate 104 having 336 ink flow paths arranged at pitches of 42.375 μm (600 DPI) as shown in FIGS. 3A and 3B, an ink jet recording head is obtained as shown in FIG. 4 in such a manner that the second substrate 104 is pressed and bonded by use of pressure means (not shown), such as an elastic member, to the first substrate 107, which is provided with discharge energy generating devices fixed to the base plate 108 which is formed by aluminum base material, subsequent to the ink paths 101 and 106 and the discharge energy generating devices having been positioned to face each other correspondingly.

With the ink jet head thus manufactured, test printing is conducted. As a result, it is confirmed that a highly precise image quality is obtainable at 600 DPI.

(Embodiment 2)

In accordance with the first embodiment, the description has been made of the case where the ink paths are arranged in a density of 600 DPI. The present invention is not necessarily limited to the provision of this density. The invention is equally effective in applying it to the arrangement densities different from the one described above. In accordance with the present embodiment, the arrangement density of the ink paths is 900 DPI. Here, its structure is formed in the same manner as the first embodiment with the exception of those particularly mentioned therefor.

In accordance with the present embodiment, the size of each ink flow path A101 on the second substrate 104 is 40 μm×23.25 μm×400 μm (that is, (the dimension in the direction A)×(the dimension in the direction B)×(the dimension in the direction C) in FIG. 2A), which is obtained by means of injection molding, and 168 paths are configured at pitches of 56.5 μm. On the ink flow path processing portions 105 on the second substrate 104, excimer laser is irradiated at 200 pulses with the laser energy density of 1 $J/cm^2$·puls on the surface of the laser processing. Then, a head is assembled as in the first embodiment, that is, 168 ink flow paths B106 are processed each in size of 40 μm×23.25 μm×400 μm (that is, (the dimension in the direction A)×(the dimension in the direction B)×(the dimension in the direction C) in FIG. 3A), and the second substrate is prepared with 336 ink flow paths arranged at pitches of 28.25 μm (equivalent to 900 DPI). After that, test printing is conducted, with the result that a highly precise image quality is obtainable at 900 DPI. In this respect, the rectangular grooves each having the dimensions as described above are configured as shown in the section A and B in FIG. 3B, because of the processing taper of 7° (degree) at the time of later processing as in the first embodiment.

(Embodiment 3)

Figure 5A:
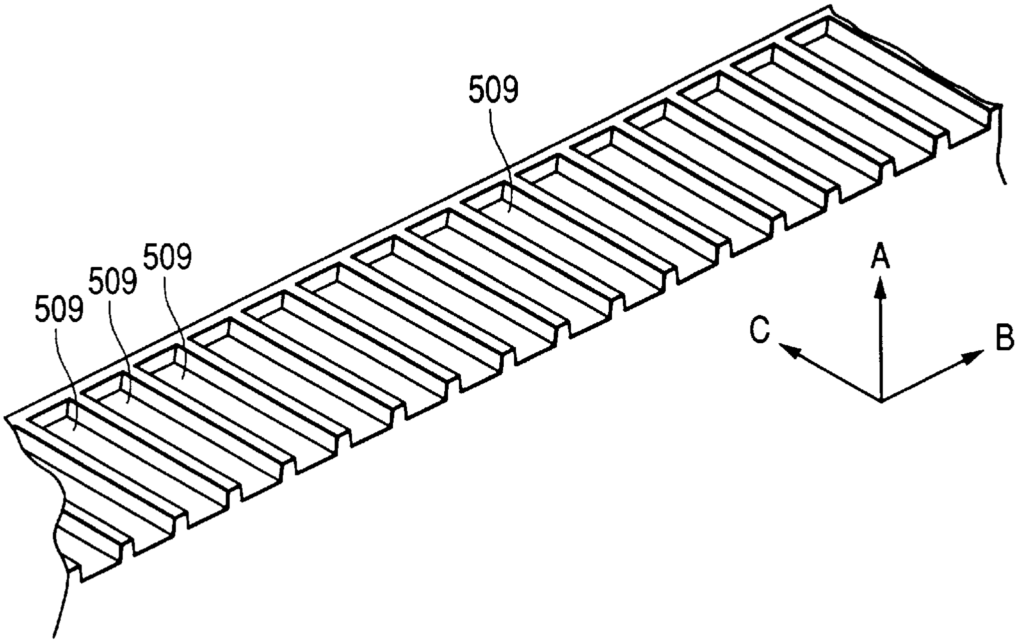
FIG. 5A is an enlarged view which shows the portion A represented in FIG. 1 in accordance with a third embodiment of the present invention.
Figure 5B:
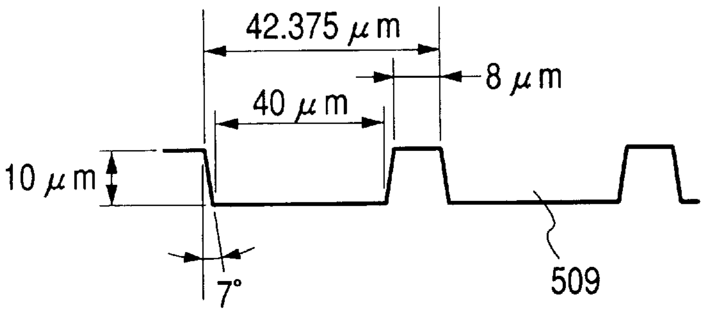
FIG. 5B is a cross-sectional view which shows the plane A and B of the portion represented in FIG. 5A.

Now, the description will be made of a third embodiment in accordance with the present invention. FIG. 5A is an enlargement corresponding to the A portion shown in FIG. 1A. In FIGS. 5A and 5B, a reference numeral 509 designates each of the ink flow paths C. The size of each ink flow path C is 10 μm×34.375 μm×400 μm (that is, (the dimension in the direction A)×(the dimension in the direction B)×(the dimension in the direction C) in FIG. 5A), which is obtained by means of molding, and 336 paths are arranged at pitches of 42.375 μm. In accordance with the present embodiment, the height of the processing portion yet to be processed is lowered between each of the ink flow paths 509. Therefore, although the width of each portion yet to be processed is made narrower, the flow-in condition of resin into the formation mold and the problem encountered when it is released from the mold are improved as compared with those in the prior art. Then, on the bottom of the ink flow paths C (each having the area of 40 μm×400 μm, that is, (the dimension in the direction B)×(the dimension in the direction C) in FIG. 5B), excimer laser is irradiated at 150 puls in the same energy density as in the first embodiment in order to produce the second substrate having 336 ink flow paths each in the same size as the one shown in FIG. 3A at pitches of 42.375 μm. In this case, too, it becomes possible to reduce the amount of laser irradiation. When the second substrate thus produced is assembled to a head as in the first embodiment, it becomes possible to obtain a highly precise image of 600 DPI. In this respect, the rectangular grooves each having the dimensions described above is actually configured as shown in the section A and B in FIGS. 3B and 5B.

(Embodiment 4)

Figure 10:
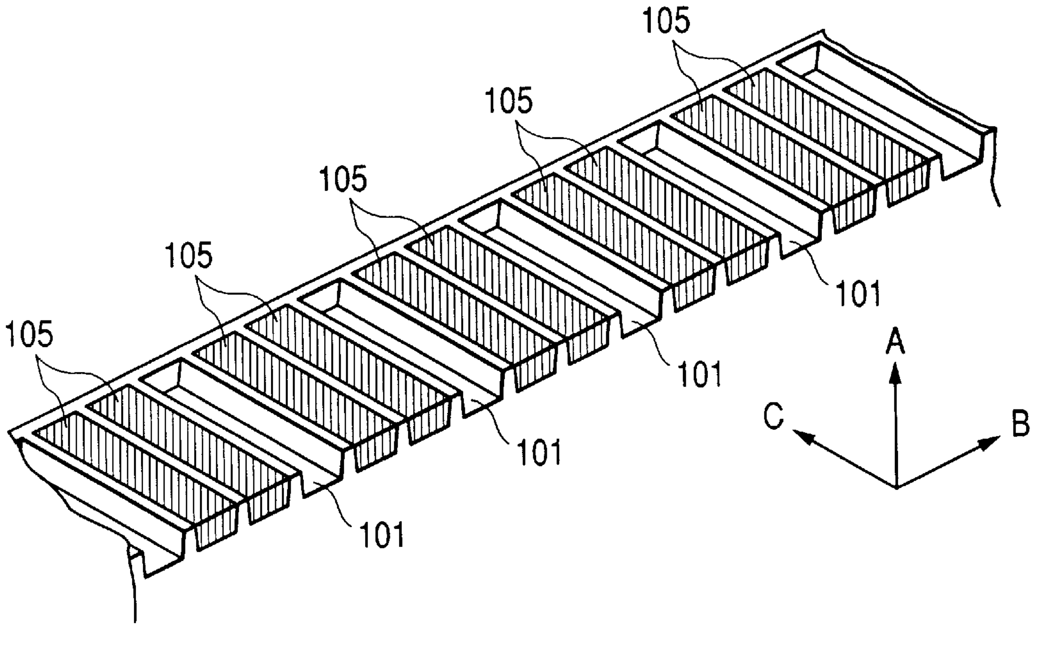
FIG. 10 is an enlarged view which shows the portion A represented in FIG. 1 in accordance with a fourth embodiment of the present invention.

For the first and second embodiments, only one ink flow path 106, which is to be laser processed, is arranged between each of the ink flow paths 101 that have been processed by means of molding formation. However, it may be possible to arrange a plurality of ink flow paths 106 between each of the ink flow paths 101 that have been processed by means of molding formation. Nevertheless, in consideration of the influences exerted by heat which is generated by laser application, it should be desirable to confine the number of ink flow paths 106 to approximately five for the laser application. FIG. 10 is a perspective view which shows a second substrate corresponding to the one shown in FIG. 2A, but having a structure where two laser processed ink flow paths 106 are arranged between the ink flow paths 101 that have been processed by means of molding formation.

In FIG. 10, those portions to be laser processed are indicated by slanted lines for the formation of the ink flow paths 106. In this respect, the arrangement density of ink flow paths is 600 DPI as in the first embodiment. When an ink jet head is produced as in the first embodiment, but using such second substrate 104 as has been described above, it is possible to perform a high quality recording as in the first embodiment.

(Embodiment 5)

Figure 6:
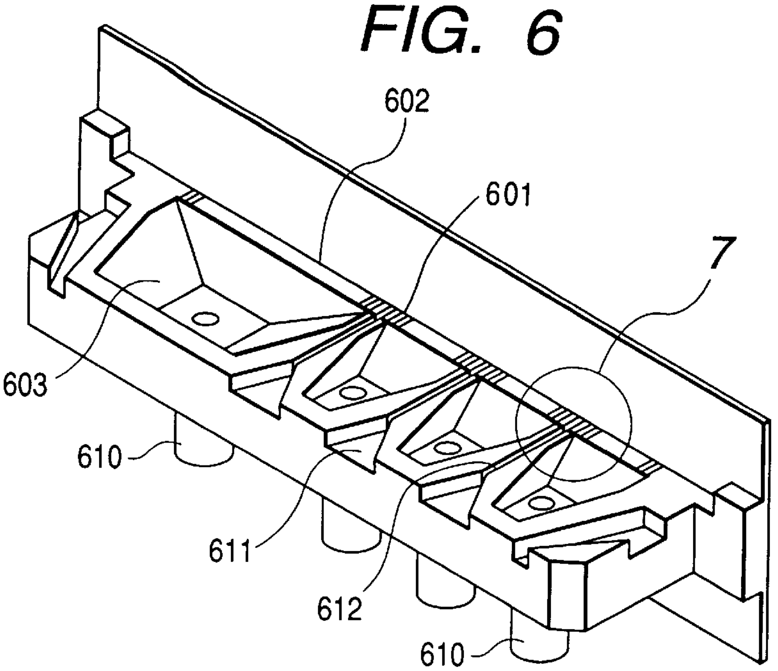
FIG. 6 is a perspective view which shows the second substrate of a color ink jet recording head in accordance with a fifth embodiment of the present invention.
Figure 7:
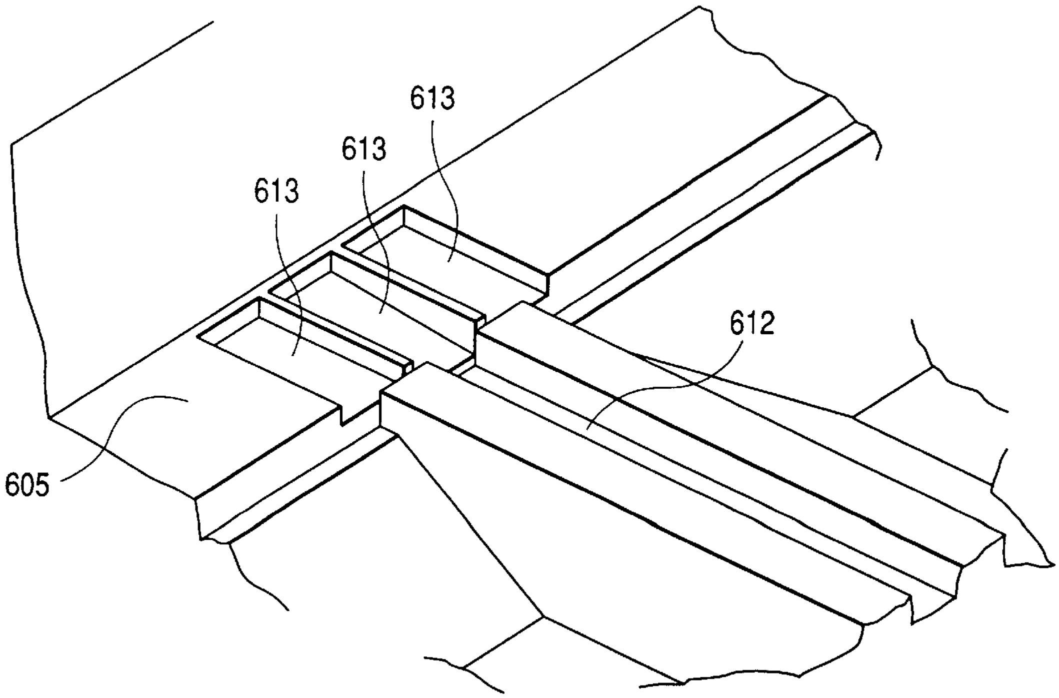
FIG. 7 is an enlarged view which shows the portion A of the portion represented in FIG. 6.
Figure 8:
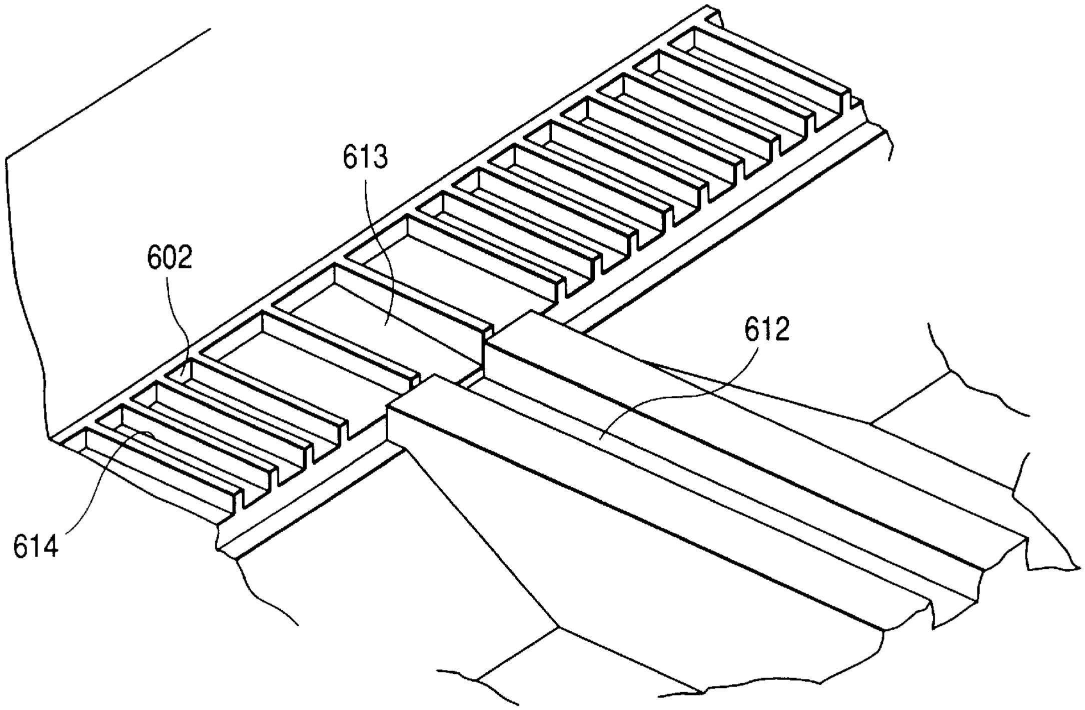
FIG. 8 is a view which shows the portion after having processed the portion yet to be processed in FIG. 7.

Now, the description will be made of a fifth embodiment in accordance with the present invention. FIG. 6 is a perspective view which shows the second substrate of a color ink jet recording head (one chip color). FIG. 7 is an enlargement of the portion 7 shown in FIG. 6. FIG. 8 is a view which shows the processing of the portion to be processed in FIG. 7. FIG. 8 is a perspective view which shows a color ink jet recording head assembled by bonding the second substrate represented in FIG. 8 together with the first substrate having discharge energy generating devices arranged on it.

In FIG. 6, a reference numeral 601 designates an ink flow path D; 602, discharge opening processing portion; 603, common liquid chambers each retaining ink of different colors, respectively; 604, a second substrate; 610, each of the ink supply openings for supplying ink to each of the common liquid chambers; 611, sealant injection openings each provided for partitioning each of the common liquid chambers 603 completely; and 612, common liquid chamber separation grooves each allowing sealant to flow in it, respectively.

Also, in FIG. 7, a reference numeral 605 designates the portion where ink flow paths are processed, and 613, each of the dummy nozzles for retaining sealant.

Also, in FIG. 8, a reference numeral 614 designates each of the ink flow paths D.

Figure 9:
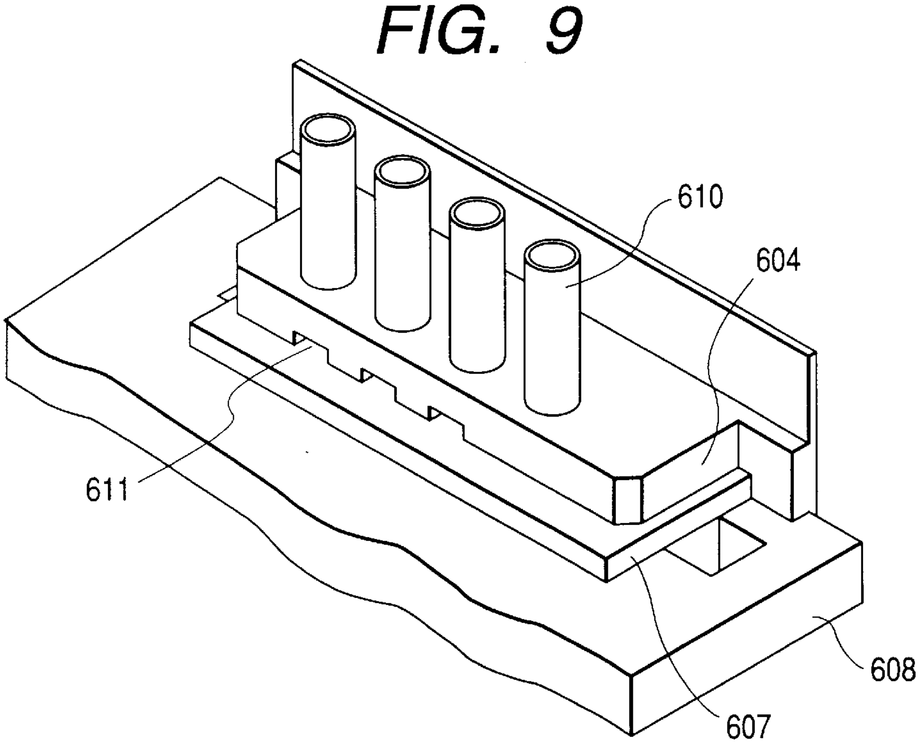
FIG. 9 is a perspective view which shows a color ink jet recording head in accordance with the fifth embodiment of the present invention.

Also, in FIG. 9, a reference numeral 607 designates a first substrate; 608, a base plate; 610, each of the ink supply openings, and 611, each of the sealant injection openings.

Now, hereunder, in conjunction with FIG. 6 to FIG. 9, the description will be made of a fifth embodiment in accordance with the present invention. At first, the second substrate 604 is processed by means of formation processing, such as injection molding, to provide in advance the dummy nozzles 613, the discharge opening plate 602 serving as the discharge opening processing portions, and a plurality of recessed portions 603 for the formation of plural common liquid chambers. Then, as in the first embodiment, the ink flow path processing portions 605 of the second substrate 604 (see FIG. 6) is processed by the application of excimer laser in order to form ink flow path groups having 336 paths at pitches of 42.375 μm. After then, as in the first embodiment, a head is assembled as shown in FIG. 9. Then, sealant is injected from the sealant injection openings 611 to partition each of the common liquid chamber 603. From each of the ink supply openings, ink of different colors is supplied for performing color printing, hence obtaining a highly precise image of 600 DPI in colors.

Here, in accordance with the present embodiment, those portions processed by means of molding formation become dummy nozzles. Therefore, although the amount of laser irradiation cannot be reduced to the same extent as the first embodiment (approximately 10% for the present embodiment), it becomes difficult for sealant to enter each of the grooves which are processed by the application of laser. As a result, sealant can be filled into the corners of the dummy nozzles reliably to separate ink of different colors assuredly once the common liquid chamber partition grooves, and the dummy nozzles adjacent to these grooves a reprocessed by means of molding formation.

Also, in accordance with the fourth embodiment, only the dummy nozzles 613 are processed by means of the injection molding, while the ink flow paths D are laser processed. However, as in the first embodiment, it may be possible to produce the dummy nozzles 713 and a part of the ink flow paths 601 by means of inject molding , and then, to process the remaining ink flow paths 614 subsequently.

(Embodiment 6)

In accordance with the first and second embodiments, the description has been made of a mode in which each of the ink flow paths processed by means of injection molding and each of the laser processed ink flow paths are arranged to reside alternately. However, the present invention is not necessarily limited to this mode. For example, it may be possible to arrange so that two ink flow paths formed by means of injection molding and two laser processed ink flow paths reside alternately or to arrange them to reside irregularly. Also, it may be possible to change the numbers of the ink flow paths formed by means of injection molding and those of the laser processed ink flow paths.

As described above, in accordance with the present invention, it is made possible to process ink flow paths with ease and good production yield even when the ink flow paths are arranged in such a high density that its formation becomes difficult by the application of formation processing. Further, as compared with the prior art, it becomes possible to reduce the total energy of laser when ink flow paths are processed. Therefore, the required load given to the optical system of a laser processor is made smaller.

Then, the ink flow paths processed by means of injection molding make it easier to perform image processing with respect to the subsequent processing step of the portions to be laser processed, because there are then no adhesion of any particles of laser byproduct. As a result, the discharge opening processing, the processing steps of sealant application, and bonding of ceiling member become easier among some others. Not only the overall production yield can be enhanced significantly, but also, the printing becomes possible in higher image quality.

What is claimed is:

1. A method for manufacturing an ink jet recording head provided with a plurality of ink paths, said ink jet recording head being constructed by bonding a second substrate having a plurality of grooves arranged thereon partially defining ink paths corresponding to a plurality of discharge openings together with a first substrate having a plurality of discharge energy generating devices arranged in correspondence to said ink paths, the plurality of grooves being arranged with a desired arrangement density, said method comprising the step of:

processing the grooves defining the ink paths on said second substrate by both formation processing and laser processing, wherein said second substrate is processed such that those of said grooves which are processed by means of formation processing and those of said grooves which are formed by laser processing are provided in alternation, wherein the grooves which are formed by formation processing have a density lower than said desired arrangement density, and wherein the grooves arranged with the desired arrangement density are formed in such a manner that a laser light arranged with a density lower than said desired density is irradiated between those of the grooves which are formed by said formation processing.

2. A method for manufacturing an ink jet recording head provided with a plurality of ink paths, said ink jet recording head being constructed by bonding a second substrate having a plurality of grooves arranged thereon to form ink paths corresponding to a plurality of discharge openings, together with a first substrate having discharge energy generating devices arranged in said ink paths, respectively, the plurality of grooves being arranged with a desired arrangement density, said method comprising the step of:

processing the grooves constituting the ink paths on said second substrate by means of both formation processing and laser processing, wherein said plurality of grooves constituting the ink paths on said second substrate are provided with a plurality of laser processed grooves between those of the grooves which are processed by means of formation processing, wherein the number of said laser processed grooves provided between each of said formation processed grooves is five or less, wherein the grooves which are formed by formation processing have a density lower than said desired arrangement density, and wherein the grooves arranged with the desired arrangement density are formed in such a manner that a laser light arranged with a density lower than said desired density is irradiated between those of the grooves which are formed by said formation processing.

3. A method for manufacturing an ink jet recording head according to either of claims 1 and 2, wherein said second substrate further comprises a plurality of recessed portions arranged in the arrangement direction of said grooves to constitute a plurality of common liquid chambers conductively connected with said ink paths, and common liquid chamber separation grooves arranged between each of said recessed portions to separate the common liquid chambers, and said common liquid chamber separation grooves and plurality of recessed portions are formed by means of formation processing, at the same time, among the grooves constituting said ink paths, the grooves conductively connected with said common liquid chamber separation grooves being processed by means of formation processing.

4. A method for manufacturing an ink jet recording head according to either of claims 1 and 2, wherein among the grooves constituting said ink paths on said second substrate, dummy nozzles not used for discharging ink are formed by means of formation processing.

5. A method for manufacturing an ink jet recording head according to either of claims 1 and 2, wherein said discharge energy generating devices are electrothermal transducing devices.

6. A method for manufacturing an ink jet recording head according to either of claims 1 and 2, wherein said plurality of ink paths are arranged in an arrangement density of 600 DPI or more.

7. A method for manufacturing an ink jet recording head according to claim 6, wherein said plurality of ink paths are arranged in an arrangement density of 900 DPI or more.

8. A method for manufacturing an ink jet recording head according to either of claims 1 and 2, wherein said laser is excimer laser.

* * * * *

UNITED STATES PATENT AND TRADEMARK OFFICE
CERTIFICATE OF CORRECTION

PATENT NO. : 6,176,012 B1
DATED : January 23, 2001
INVENTOR(S) : Shin Ishimatsu

It is certified that error appears in the above-identified patent and that said Letters Patent is hereby corrected as shown below:

Title page,
Item [56] FOREIGN PATENT DOCUMENTS,
"49131244 5/1992 (JP)" should read -- 4-131244 5/1992 (JP) --.

Column 1,
Line 31, "arrange" should read -- arranged --.

Column 3,
Line 59, "In" should read -- in --.

Column 5,
Line 58, "is" should read -- are --;
Line 59, "section" should read -- sections --.

Column 7,
Line 5, "grooves," should read -- grooves --;
Line 6, "a" should read -- are --;
Line 12, "molding," should read -- molding, --;
Line 38, "are" should read -- is --.

Signed and Sealed this

Second Day of April, 2002

Attest:

JAMES E. ROGAN
*Director of the United States Patent and Trademark Office*

*Attesting Officer*